No. 705,104. Patented July 22, 1902.
J. M. LONGAN.
ORE WASHER AND SEPARATOR.
(Application filed May 7, 1901.)
(No Model.) 2 Sheets—Sheet 1.
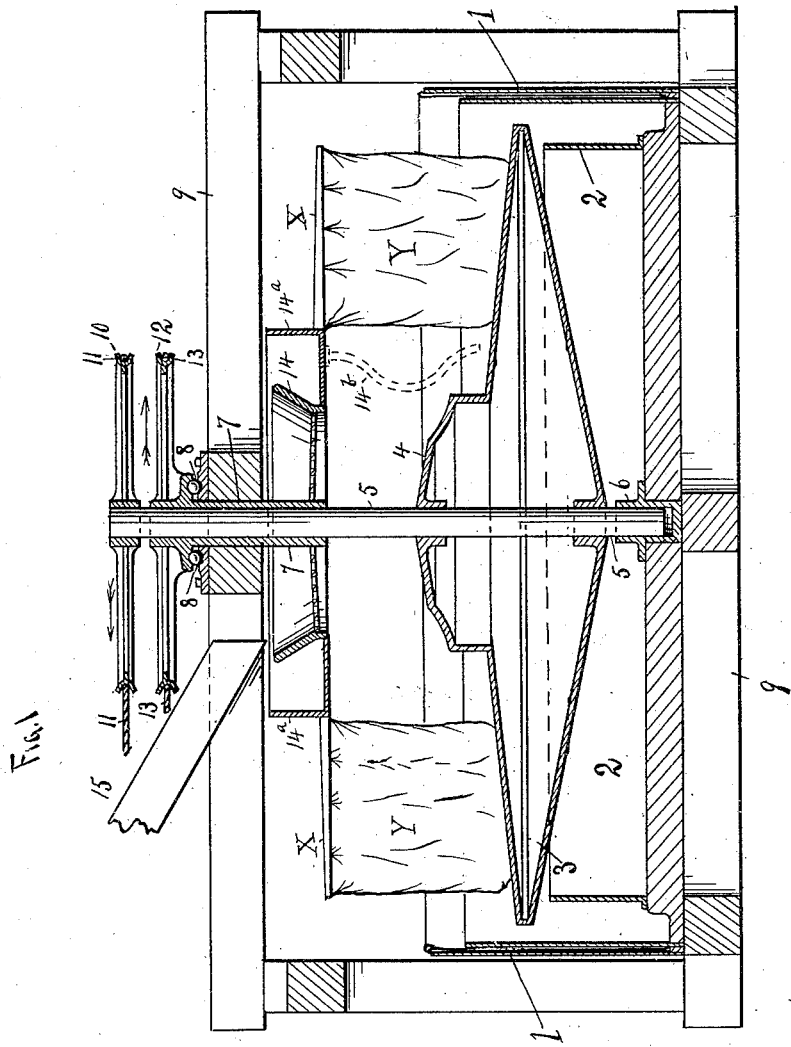
Witnesses
C. H. Woodward
J. W. Garner
J. M. LONGAN, Inventor
By C. A. Snow & Co.
Attorneys No. 705,104. Patented July 22, 1902.
J. M. LONGAN.
ORE WASHER AND SEPARATOR.
(Application filed May 7, 1901.)
(No Model.) 2 Sheets—Sheet 2.
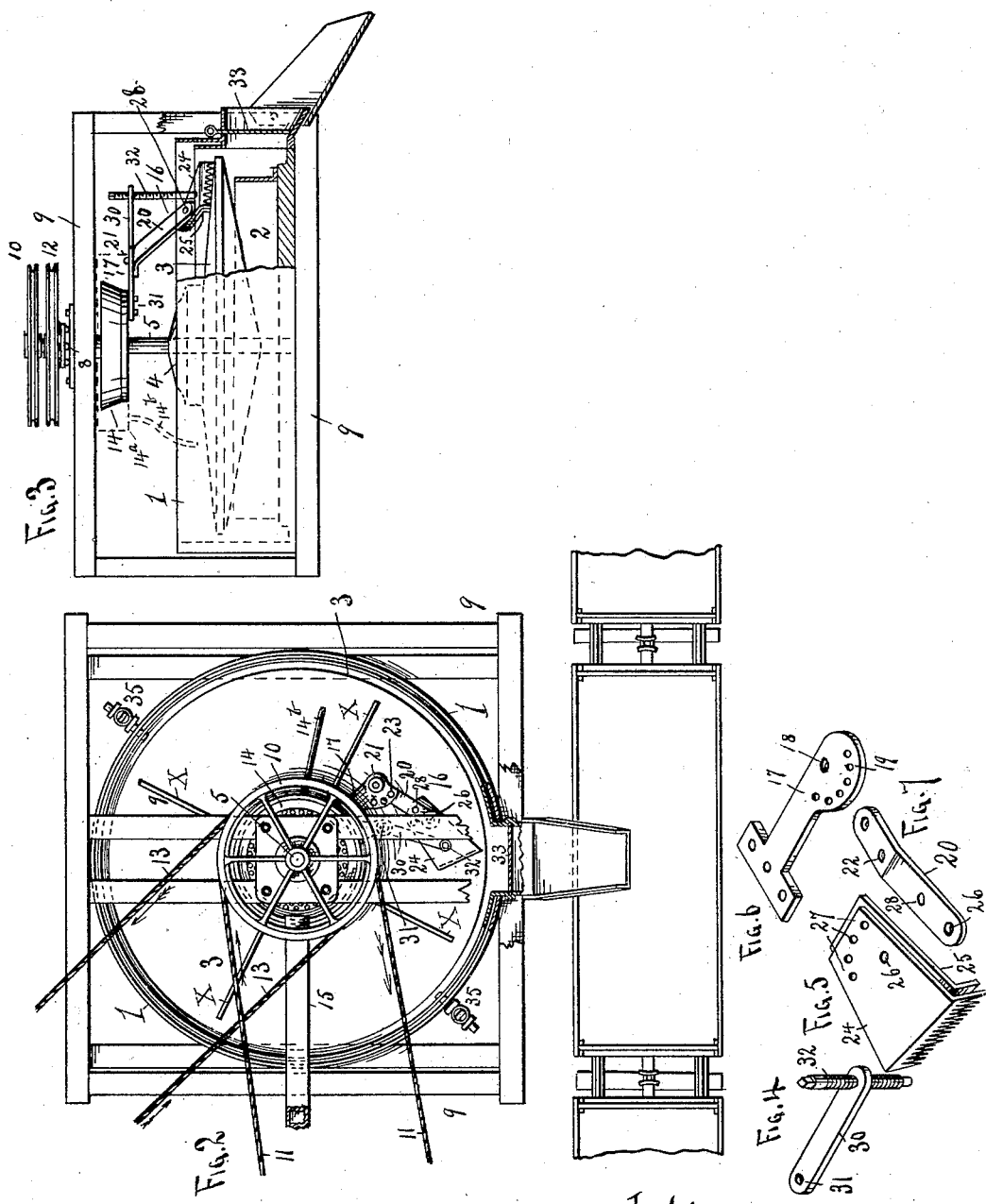

UNITED STATES PATENT OFFICE.

JAMES M. LONGAN, OF EMPIRE CITY, KANSAS, ASSIGNOR OF NINE-SIXTEENTHS TO E. V. WYSSBROD, OF JOPLIN, MISSOURI.

ORE WASHER AND SEPARATOR.

SPECIFICATION forming part of Letters Patent No. 705,104, dated July 22, 1902.

Application filed May 7, 1901. Serial No. 59,159. (No model.)

*To all whom it may concern:*

Be it known that I, JAMES M. LONGAN, a citizen of the United States, residing at Empire City, in the county of Cherokee and State of Kansas, have invented a new and useful Ore Washer and Separator, of which the following is a specification.

My invention is an improved ore washer and separator; and it consists in the peculiar construction and combination of devices hereinafter fully set forth and claimed.

In the accompanying drawings, Figure 1 is a vertical sectional view of an ore washer and separator embodying my improvements. Fig. 2 is a top plan view of the same. Fig. 3 is partly an elevation and partly a sectional view taken on a plane at right angles to that of Fig. 1. Figs. 4, 5, 6, and 7 are detail views.

In the embodiment of my invention I provide a tank 1, which is preferably circular in form and is here shown as of telescopic construction, so that the sides of the tank may be extended vertically, as may be desired, to deepen the tank and the water therein. Within the tank 1 is an inner tank 2 of considerably less diameter and which is concentric in tank 1, and the said tank 2 is kept at all times filled with water. A revoluble float-table 3 is disposed in the tank 1, and the central lower portion thereof is disposed in the inner tank 2. The said float-table may be either of the form here shown or of any other suitable construction and is provided at its center, on its upper side, with a drum 4. The said float-table is fast to a shaft 5 and is revolved with said shaft. The lower end of the latter is here shown as stepped in a tubular bearing 6 in the bottom of tank 1, and said shaft near its upper portion is here shown as having its bearing in a tubular sleeve 7, the latter being supported by a ball-bearing 8 on a suitable framework, (indicated at 9.) Said shaft 5 is adapted to move vertically in said tubular sleeve-bearing. The framework may be otherwise constructed than as here shown, and I do not limit myself in this particular. The shaft 5 has a wheel 10, which is fast to said shaft and is rotated by any suitable means in order to rotate said shaft 5 and the table 3. As here shown, the wheel 10 is peripherally grooved and is adapted to be rotated by a suitable power cable or belt 11; but I do not limit myself in this particular. The bearing-sleeve 7 has a wheel 12 fast thereto, by means of which said bearing-sleeve may be rotated. Said wheel 12 may be rotated by any suitable means and is here shown as being peripherally grooved and adapted to be rotated by a power belt or cable 13. I do not, however, limit myself in this particular. A revoluble hopper 14, which may be either of the construction here shown or of any other suitable construction, is carried and rotated by the sleeve 7 and is disposed above the drum 4. As here shown, the bottom of the hopper is provided with openings through which the sludge fed to the hopper by any suitable means, as by a suitable trough 15, is discharged onto the drum.

A sweep 16 is carried by the hopper 14. The latter, as here shown, has an arm 17, that projects therefrom. Said arm has a pivotal opening 18 near its outer end and a series of adjusting-openings 19, which are concentric therewith. A trail-bar 20 is pivoted to the arm 18, as at 21, and has an opening 22, which may be caused to register with either of the adjusting-openings 19. A suitable lock-pin 23 may be placed in said registering openings to lock the trail-bar to the arm 17 at any desired angle with relation thereto. A pair of sweep-blades 24 25 are preferably employed, which are pivotally attached to the rear end of the trail-bar 20, as at 26. Thereby said sweep-blades may be turned to any desired angle with relation to said trail-bar. Said sweep-blades are provided with adjusting-openings 27, any of which may be caused to register with an opening 28 in the trail-bar, and a suitable lock pin or bolt being inserted in said registering openings, said sweep-blades may be secured at any desired angle with relation to the trail-bar, and hence the sweep-blades may be secured at any point on the table 3 between the drum 4 and the periphery of the table and either radially or obliquely on the table.

An arm 30 is pivotally connected to the hopper, as at 31, or in any other suitable manner, and carries a screw 32, the lower end of which is connected to the sweep and by means of which the sweep-blade may be adjusted vertically and caused to operate at any desired height above the float-table 3 and by means of which the sweep-blades may be depressed on the surface of the table. By this means the ore deposited on the revoluble float-table may be cut therefrom and caused to pass through a suitable gate 33, with which the tank 1 is provided.

The revoluble float-table and the feed-hopper are independently revoluble, and either of them may be rotated in either direction and at any desired rate of speed.

The tank 1 is provided with one or more mud-valves 35, by means of which the silt may be discharged therefrom.

The operation of my invention is as follows: The water which is maintained in the inner tank 2 suffices to sustain the weight of the revoluble float-table before the latter is charged with ore. Initially the feed-hopper may be stationary and the float-table in revolution, or the feed-hopper may be revolved in the opposite direction to the float-table, or the latter may be stationary. The sludge which passes through the feed-hopper and falls upon the drum passes from the latter onto the revoluble float-table, the heavier and more valuable ore particles settling on the float-table immediately around the drum, the less valuable ore particles disposing themselves according to the grades concentrically, the least valuable being outermost. The worthless silt becomes deposited near the periphery of the float-table and part of it is carried by the water into the outer tank 1 and may from time to time be discharged therefrom through the mud-valves 35. While the sludge is being deposited on the revoluble float-table and the silt washed from the ore the sweep is raised above the body of the material on said revoluble float-table. Initially the edge of the table is on the level of the water in the tank. As the material increases in depth on the table the latter sinks and the water in the tank rises correspondingly, and the lateral inward pressure of the column of water in the tank and above the table retards the outward flow of the material on the table, thus causing the ore to be banked and deposited on the table and preventing its premature discharge therefrom. The outer tank being of telescopic construction, the column of water therein may be deepened to any desired extent while the revoluble float-table is being loaded with the ore during the washing and separating process. When the material has accumulated on the revoluble float-table to the desired depth, the revolution of the float-table is suspended, the supply of sludge thereto cut off, and the water and silt drawn off from the outer tank. The gate 33 is then opened, the sweep is disposed in such manner as to operate on the worthless silt near the edge of the table, and the latter is then revolved, thereby causing the silt to be cut therefrom and discharged through the gate 33. The sweep is then disposed and the table revolved in such manner as to cut off and discharge from the table the various grades of ore successively. Those grades which are of least value may be subsequently rewashed either by the same or another machine, while the higher grades may be suitably treated. In practice when the material is discharged from the outer tank the same becomes loaded into a car of suitable construction, thereby avoiding the necessity of shoveling the material. The car may by a suitable trackway be run to a higher point to discharge its contents into the trough 15 when it is desirable to retreat the material on the same machine, or the car may be run to another machine and discharged of its contents by gravity, thus entirely avoiding the necessity of shoveling the material. The car may be of any suitable construction and may be unloaded hydraulically by causing a stream of water to be discharged therein to wash the material therefrom.

On the outer side of the hopper 14 is an annular water-tank 14ª, which becomes filled with water that overflows the hopper. A suitable hose (indicated in dotted lines at 14ᵇ) may be attached to the said tank 14ª and used for washing material from the top of the revoluble float-table.

The usual bars X may be attached to the hopper and extended over the table and the usual cloth streamer Y may be suspended from said bars to operate on the table to cause the material to settle evenly thereon.

Having thus described my invention, I claim—

1. In an ore washer and separator, the combination of a tank, a revoluble vertically-movable float-table therein, a drum on said table and means to discharge sludge onto said drum, substantially as described.

2. In an ore washer and separator, the combination of an outer tank of telescopic construction, and an inner tank therein, a vertically-movable revoluble float-table disposed in said tank and means to discharge sludge onto said float-table, substantially as described.

3. In an ore washer and separator, the combination of a tank, a revoluble vertically-movable float-table therein, a shaft carrying said table, a sleeve-bearing in which said shaft rotates and is adapted to move vertically, said sleeve-bearing being revoluble independently of said table, and a feed-hopper carried by said independently-revoluble sleeve-bearing, substantially as described.

4. In an ore washer and separator, the combination of a water-tank having a discharge-gate on one side, a revoluble vertically-movable float-table in said tank, a feed-hopper revoluble independently thereof, a sweep connected to and carried by said feed-hopper, said sweep being adapted to operate on said table, for the purpose set forth, means to raise and lower said sweep, and means to adjust the same, substantially as described.

In testimony that I claim the foregoing as my own I have hereto affixed my signature in the presence of two witnesses.

JAMES M. LONGAN.

Witnesses:
W. R. ELLIOTT,
W. H. STEPHENSON.